United States Patent Office 2,775,571
Patented Dec. 25, 1956

2,775,571

AMIDE-ALDEHYDE RESINS FROM AMIDES OF OXIDIZED PARAFFIN ACIDS

John P. Buckmann, Yorba Linda, Calif., assignor to Union Oil Company of California, Los Angeles, Calif., a corporation of California No Drawing. Application July 27, 1953,
Serial No. 370,629

9 Claims. (Cl. 260—39)

This invention relates to synthetic resinous products suitable for molding and calendering and to methods of preparing such products. More specifically it relates to condensation products of acid amides prepared from a particular fraction of acids, obtained by oxidizing paraffin wax, with aldehyde substances such as low molecular weight aldehydes or aldehyde genitors, as for example, from aldehyde polymers. It relates also to the moldable resins and filled moldable resins produced by the condensation mentioned, which products are resistant to water, kerosene and like solvents and to methods of preparing such resins.

It has been found that acid amides prepared by amidating a particular acidic fraction recoverable from oxidized paraffin wax, which wax has been oxidized in a certain manner and to a definite degree when condensed with formaldehyde or acetaldehyde or compounds which decompose to furnish such aldehydes, produce resins which are particularly suitable for molding and calendering. The resulting molded or calendered articles are highly resistant to water and the ordinary solvents, as for example, hydrocarbon solvents, alcohols and the like, making them particularly useful in the usual applications of molded and calendered articles, as for example, as floor tile, toys, handles, knobs, parts for electrical apparatus, telephone parts and the like. In preparing the resin which is suitable for molding, calendering, etc., the condensation is generally effected in the presence of a filler and importantly a condensation catalyst is employed.

Although resins of the amide-aldehyde type have been available the amides have been costly to produce because of the high cost of acids suitable for use in preparing the amides. The acids employed herein are relatively cheaply produced, involving only a simple air-blowing of paraffin wax followed by simple extraction of the wax oxide to separate a particular fraction of acids therefrom.

An object of this invention is therefore to prepare a synthetic resinous material particularly suitable for molding, calendering or the like.

Another object of this invention is to prepare a synthetic resin having properties making it suitable for use in the manufacture of molded or calendered articles from relatively cheap raw materials.

A more specific object of this invention is to prepare a synthetic resin which is hard, strong and durable, particularly when compounded with fillers, and which is suitable for shaping by molding or calendering or the like, which synthetic resin is produced by condensing a low molecular weight aldehyde or an aldehyde genitor with a particular mixture of amides obtained by amidating a fraction of acids recoverable from oxidized paraffin wax.

It is found that the above and related objects are accomplished by oxidizing paraffin wax such as a refined or deoiled paraffin wax having a melting point between about 43° C. and 95° C., and preferably between about 55° C. and 80° C. The oxidation is effected by heating the wax to a temperature between about 100° C. and 140° C. at a pressure between about normal atmospheric pressure and about 20 atmospheres pressure and blowing the melted wax with air or other gas containing free oxygen, e. g. oxygen, oxygen enriched air, etc., until the acid number of the product is between 200 and 350 mg. KOH/g. Following the oxidation, the crude oxidized wax is extracted with water to remove water-soluble oxidation products including low molecular weight fatty acids, low molecular weight dicarboxylic acids and other low molecular weight water-soluble partial oxidation products, and subsequently extracted with a light petroleum naphtha, thinner or hydrocarbon solvent, such as pentane, hexane or heptane or a hydrocarbon fraction containing one or more of these hydrocarbons, to remove naphtha-soluble components of the oxidized mixture. This treatment removes fatty acids, unoxidized wax and partial oxidation products such as alcohols, ketones and the like. The resulting water-insoluble, naphtha-insoluble fraction is the acid fraction which is useful in preparing the amides suitable for use in the preparation of the resins of this invention.

It is essential that the oxidation be carried to the degree indicated, i. e., until the acid number of the oxidized product is within the range indicated in order to produce a water-insoluble, naphtha-insoluble fraction having the desired characteristics. It is found that if the acid number of the oxidized wax is below about 200 mg. KOH/g., only small amounts of a water-insoluble, naphtha-insoluble fraction is recovered and that this fraction does not have all of the desirable characteristics which are to be found in the corresponding fraction recovered from a wax oxidate having an acid number within the range of 200 to 350 mg. KOH/g. Moreover, it is found that if the oxidation is carried to such an extent that the oxidized wax has an acid number appreciably above 350, as for example, 400 to 500 or above, the product becomes primarily water-soluble and the water-soluble acids are not satisfactory for use in preparing the synthetic resins of this invention. It is believed that when the oxidation is carried to a point below that indicated to be desirable, the major proportion of acids produced are mono-carboxylic acids of the fatty acid type. Under any circumstance these acids are not useful in preparing the amides and the condensation products described herein. Moreover, it is believed that when the oxidation is carried beyond the point indicated to be desirable, the product contains large proportions of dicarboxylic acids and possibly more highly oxidized materials which are again not suitable for the preparation of amides which are useful in preparing the condensation products of this invention.

The fraction referred to hereinafter as the water-insoluble, naphtha-insoluble fraction is the fraction recoverable from oxidized paraffin wax of 200 to 350 acid number. This fraction has an acid number between about 140 and about 200 mg. KOH/g., a saponification number-acid number ratio usually between about 1.6 and 2.2 to 1, although the ratio is sometimes as low as 1.4 to 1, and a ratio of total oxygen to carboxyl oxygen, i. e., oxygen contained in —COOH groups or in —COOR groups, between about 1.4 and 1.6 to 1, although this ratio may vary depending upon the conditions and extent of oxidation between 1.2 and 1.8 to 1. The fraction must be identified in this manner since because of the complexity of the mixture of acids present it is not possible to define the acids present by structure. It is believed that the major proportion of the acids present are hydroxy carboxylic acids, ester acids and the like containing from about 6 to about 60 carbon atoms per molecule, however, it is the mixture of acids produced and separated in the manner described which applicant finds useful in preparing the amides which are condensed with an aldehyde to give the resins of this invention.

It is to be noted further that the method of oxidation appears to be critical. Thus, acids produced by oxidation with nitric acid and other chemical oxidizing agents of this type have not produced resins of the character and quality of those prepared from the acids obtained in the manner described herein.

It is recognized that acids having the characteristics described hereabove are present in the oxidized mixture obtained as described herein and that extraction with water and with naphtha to obtain the particular water-insoluble, naphtha-insoluble fraction described is but one method of obtaining the segregation of acids of this character. Other methods may be employed and such other methods include extraction of the water-washed oxidized wax with aqueous solutions or slurries of an alkali metal borate such as sodium borate. In such cases the water-washed oxidized wax is extracted with a sufficient amount of the metal borate solution or slurry to produce complexes with the acids which it is desired to separate, i. e. the so-called naphtha-insoluble acids. After extraction the borate phase containing the desired acids is acidified with mineral acid to release the organic acids. This extraction with borax is generally effected at temperatures between 20° and 100° C. and preferably, before extraction, the water-washed oxidized wax is mixed with 1 to 10 volumes of a hydrocarbon solvent such as naphtha.

Other methods of separating the desirable fraction from the water-washed oxidized wax include fractional solution in sulfuric acid or fractional precipitation from sulfuric acid. In the former method the water-washed oxidized wax is repeatedly contacted with progressively increasing concentrations of sulfuric acid starting with about 65% acid and finally extracting with about 95% acid. In such an extraction process it is found that the desirable acid fraction referred to herein as the naphtha-insoluble acid fraction is obtained with 70% to 75% sulfuric acid. The first extraction with 65% acid appears to remove water remaining from the water washing operation, together with normally water-soluble acidic materials and the final extractions, i. e. with acid concentrations of 80 to 90 or 95% concentration of sulfuric acid, result in the separation of acids which are normally soluble in petroleum naphtha. In such cases it is the intermediate fractions that are desirably separated for use in the preparation of amides.

Following the second method, i. e. fractional precipitation from sulfuric acid, the water-washed oxidized wax is contacted with 90% to 95% sulfuric acid to dissolve substantially all of the acids present and, after separation of unreacted wax and neutral oxygenated compounds from the sulfuric acid solution, the fraction comprising sulfuric acid and dissolved acidic constituents is diluted with water, the water being added in increments. In such case the first materials to be precipitated are the neutral oxygenated constituents and the fatty or naphtha-soluble acids. Following the precipitation of these materials the fraction of acids corresponding to the naphtha-insoluble acids are precipitated by further dilution. It is to be noted that acetic acid may be used in place of sulfuric acid in the above fractionation process.

Various procedures can be employed according to this invention to amidate the oxidized paraffin wax or a fraction thereof to produce amides having the desirable characteristics described herein.

In the preferred method the fraction referred to herein has the water-insoluble, naphtha-insoluble fraction, is heated to a temperature between about 50° C. and 150° C. and ammonia gas is bubbled into the mass. The reaction with ammonia is continued until no further water is evolved, requiring generally between about 0.5 and 24 hours. During the heating and blowing with ammonia gas the temperature is gradually increased and the amidation is completed at a temperature between about 150° C. and 250° C., preferably about 180° C.

The amidation may also be caused to occur under pressure, or with various catalysts, such as the ammonium halides, activated clays, silica gel and the like. It is most convenient to remove the water of reaction from the zone of reaction; excess ammonia may then be separated and recycled or used in some other process as desired. The resulting product may be substantially neutral, however, generally the amides so formed will be slightly acidic indicating that most, but not all, of the acid groups have been converted to amide groups during the treatment. Usually the resulting product will contain between about 3% and 7 or 8% of amido nitrogen and between 0.2% and 2% of amino nitrogen as indicated by determining total nitrogen using either the well known Kjeldahl or micro-Dumas nitrogen determination and determining the amino nitrogen by the method of Van Slyke, also well known. The amido nitrogen content is obtained by difference.

As a modification of the preferred method the oxidized wax or fraction thereof is converted to the ammonium salts or soap in any of several ways, i. e. by reaction with ammonium hydroxide or by forming the sodium soap or salt by treatment with caustic alkali and the resulting sodium compound is metathesized with ammonium chloride. The resulting ammonium compound is heated to a temperature between about 150° C. and about 220° C. to effect dehydration and conversion of the ammonium compound to the corresponding amide.

Another method of preparing the amides is to prepare the sodium salt or soap of the oxidized wax or fraction thereof and heat the dry sodium compound with dry ammonium chloride at temperatures between about 150° C. and 450° C. During the heating, water and sodium chloride are formed and the sodium compound is converted directly into the amide.

In another method the oxidized wax or fraction thereof is treated with phosphorus trichloride, thionyl chloride, hydrogen chloride, or the like, and the resulting mixture of acid chlorides is treated with aqueous or alcoholic ammonia. In this treatment ammonium chloride and amides are the resulting products. Temperatures in the range of 0° C. to 50° C. are usually used in effecting this latter conversion. Preferably the reaction is carried out at room temperature.

Still another method of producing the amides consists in first esterifying the oxidized wax or fraction with alcohol, as for example methyl alcohol, to form the corresponding alkyl esters and the resulting esters are treated with $NH_3$ to convert them into amides. This ammonolysis can be carried out without a solvent or in alcoholic solution or in solution in other polar organic solvent at temperatures ranging from −10° C. to 300° C. and pressures ranging from 1 to 200 atmospheres. The ammonium halides are especially useful catalysts in the conversion.

Still another method of preparing the amides consists in heating the wax oxidate or fraction thereof with an ammonia genitor, e. g., carbonate, ammonium carbamate, ammonium formate, ammonium acetate, formamide, acetamide or other lower acylamide, to a temperature in the range of 120° C. to 300° C. This reaction results in the liberation of carbon dioxide and water in the case of urea, ammonium carbonate, ammonium carbamate and the like and in the formation of water and formic acid in the case of ammonium formate. With the lower acylamides, the reaction results in the liberation of the corresponding acid in anhydrous form. All of the reaction products other than amides may be removed from the reaction mixture by evaporation or distillation.

The amides prepared by any of the above methods are generally clear dark-brown viscous liquids, substantially insoluble in hydrocarbon solvents such as naphtha, aromatic solvents, e. g., benzene, toluene, xylenes, alcohols and esters, but are soluble in ketones such as acetone, methylethyl ketone and the like. These amides generally have acid numbers in the range of 15 to as high as about 60 mg. KOH/g. and saponification numbers in the range of about 80 to as high as about 250 mg. KOH/g. with corresponding ester numbers between about 20 to about 200. Although it is substantially impossible to determine molecular weights of the amide products, on the basis of molecular weights of the acids present in the oxidized wax it is logical to assume that these amides have an average molecular weight above about 250.

As indicated hereabove the amides produced from the water-insoluble, naphtha-insoluble fraction of oxidized paraffin wax are liquid or fluid whereas previously known amides are solid, generally crystalline materials. It is believed that the fact that the particular mixture of amides described herein is fluid contributes to its value in preparing desirable moldable resins. Thus, it is not necessary to incorporate plasticizers because the amides themselves appear to act a plasticizers, particularly where insufficient aldehyde is employed in the condensation reaction to react with all of the amide employed. Thus, by varying the ratios of aldehyde to amide it is possible to produce resins ranging from relatively soft to relatively hard products.

As employed herein, the term "acid number" is the numerical value of the acidity expressed in milligrams of KOH per gram of substance and is determined by the method described in A. S. T. M. Standards on Petroleum Products and Lubricants, October, 1947, page 639. The term "saponification number" as used herein is the saponification equivalent expressed in milligrams of KOH per gram of substance as determined by the method described in the A. S. T. M. Standards, above cited. The term "ester number" is the numerical difference between the saponification number and the acid number and is expressed in the same units.

By the term "aldehyde substance" as used herein is meant formaldehyde, acetaldehyde, hexamethylene tetramine, trioxane, para-formaldehyde, monomethylol dimethyl hydantoin, dimethylol urea, dithiobiuret, glyoxal, and similar aldehydes and aldehyde genitors. The preferred compounds are the low molecular weight aldehydes, as for example, formaldehyde and acetaldehyde and low molecular weight formaldehyde genitors, as for example, hexamethylene tetramine, trioxane and para-formaldehyde. The amount of aldehyde or aldehyde substance to be employed will be between about 0.1 and about 0.3 part per part of amide.

In carrying out the condensation reaction it is essential that a condensation catalyst be employed. It is not important to this invention that a particular catalyst be employed however. Many different types of condensation catalysts are known for effecting this type of reaction and all of the known catalysts appear to be useful. Thus, the following compounds, including various acidic, basic and neutral compounds have been found to be effective as catalysts for the condensation reaction described herein.

ACIDS

Phosphoric acid
p-Aminophenol
Lactic acid
Salicylic acid
Petroleum sulfonic acids
Tartaric acid
Boric acid
1-amino-8-naphthol-6-sulfonic acid
Hydrochloric acid
Sulfuric acid
Sulfosalicylic acid
2,4-dihydroxybenzaldehyde
Alizarine
Resorcinol
Dinitrophenol
Glycolic acid
m-Aminophenol
3,5-dinitro-o-cresol
1-amino-8-naphthol-4-sulfonic acid
2,4-dihydroxy benzoic acid
Diphenyl p,p'-disulfonic acid
Alpha-hydroxydecanoic acid
Glycine
Aspartic acid
Phenol
p,p'-Dihydroxydiphenyl sulfide
2,2'-bis-(p-hydroxyphenyl) propane
Naphthalene disulfonic acid-1,5
1,5-dihydroxydiphenyl sulfone
Thiosalicylic acid
Xylenol
Picric acid
Sulfanilic acid
m-Sulfobenzoic acid
1,5-dihydroxynaphthalene terephthalic acid
1-p-sulphophenyl-3-methyl-5-pyrazolone
p-Cresol
Pyrogallol
Hydroquinone
p-Toluenesulfonic acid
2,4-dinitro-1-naphthol-7-sulfonic acid
Trichloro-acetic acid
1-amino-2-naphthol-4-sulfonic acid
Phloroglucinol
o-Aminophenol
2-amino-5-naphthol-7-sulfonic acid
o-Sulfobenzoic anhydride
4-Sulfophthalic anhydride
o-Aminophenol-p-sulfonic acid

BASES

Calcium hydroxide
Sodium hydroxide
Ethylene diamine
p,p'-Diaminodiphenylmethane
Phenyl methyl pyrazolone
Dinitrophenylhydrazine
Phenyldiethanolamine
Aminoethanol ethanolamine

NEUTRALS

Ammonium sulfate
Chloroacetamide
Resacetophenone
Trimethylol nitromethane
Dicyandiamide
Ethanolurea
Vanillin The amount of catalyst to be employed will vary depending upon the catalyst and upon the particular aldehyde or aldehyde substance employed, but will generally vary from about 0.05 to 0.3 part per part of amide. All of the catalytic agents listed are effective in producing the condensation reaction within the proportions indicated.

Although for some puproses the synthetic resins may be prepared without incorporating fillers, generally in order to produce desirable molded or calendered products, the amide and the aldehyde substance will be mixed with and condensed in the presence of between about 10% and about 85% by weight, based on the amide, of filler. The fillers which may be employed alone or in combination include substantially all of the fillers normally used in preparing moldable resins. Some of the fillers also act as pigments which control the color of the final molded or calendered product. Included among the fillers and/or pigments which may be used are clays such as the commercially available clays; powdered or ground silicas; metal oxides, as for example the various iron oxides and oxides of chromium, magnesium, titanium, lead zinc and calcium; hydroxides, as for example, calcium and magnesium hydroxides; sulfates, such as barium sulfate, calcium sulfate and the like; and carbonates, such as calcium, copper, basic lead, magnesium and zinc carbonates, have been found to be satisfactory fillers. Also, asbestos fibers, wood flour, glass wool, glass cloth, canvas, burlap, chopped wool cloth, chopped rayon cloth, cotton flock, powdered oil shale, powdered oil shale ash, talc, powdered mica, pumice, Carborundum, antimony pentasulfide, feldspar, fluorspar, etc., are all useful as fillers in the resin compositions.

The following materials, many of which are also effectice as fillers, have the property of imparting the indicated colors to the resin compositions of this invention. This list is not intended to include all of the materials which may be employed but merely to indicate the type of materials which may be employed.

WHITE

Lithopone
Zinc oxide
White lead
Titanium dioxide and extended titanium dioxide pigments

RED

Iron oxide (red)
Nickel dimethylglyoxime
Some natural red clays

BLUE

Phthalocyanines
Ultramarine blue

GREEN

Phthalocyanines

ORANGE

Iron oxide (orange)
Litharge
Antimony pentasulfide
Red lead

BROWN

Iron oxide (brown)
Numerous clays

BLACK

Coke
Carbon black

In preparing the molding compositions, the amide prepared as described hereinabove, aldehyde substance or genitors, as for example, para-formaldehyde, condensation catalyst, as for example, p-aminophenol, and filler such as asbestos fibers, are thoroughly mixed and heated to a temperature of 80° C. to 150 C. with stirring until a stiff paste is formed and then transferred to an oven at a temperature within the same range for curing. Curing times vary from about 5 minutes to about 6 hours depending on the temperature, composition, etc. During the curing operation, the mass solidifies to form the desired resin or condensation product. Following curing, the product may be ground to a granular or powder form and then molded or calendered by well known processes. Thus, in molding, the powder may be placed in a pressure mold which may be first treated with a mold release agent and heated to a temperature of approximately 100 C. under a pressure of 1500–5000 pounds per square inch for 1 to 45 minutes.

The following examples will serve to illustrate certain forms and modifications of the invention, including the preparation of acids suitable for use in preparing the amides, methods of amidation, i. e., preparing the amides themselves, and methods of producing resins by condensing amides with aldehydes or aldehyde substances described herein. The examples show the production and characteristics of typical moldable resins and molded and calendered products. It is to be understood that variations in the procedures involved and in the compositions may be made by one skilled in the art without departing from the basic principles of the invention and for this reason the examples presented are not to be taken as limiting the invention to the particular methods and compositions described.

*Example 1*

Acids suitable for use in the preparation of amides useful in preparing the resins of this invention have been prepared by the following process. About 8600 parts by weight of a refined petroleum wax having a melting point of 63° C. were introduced into an oxidation vessel provided with heating and cooling coils and with means for introducing and dispersing air at a point near the bottom of the vessel. The wax was heated to about 130° C. at a pressure of 100 p. s. i. gage. Air was introduced into the oxidation vessel at a rate of 5.5 cu. ft./barrel/minute. After about 20 hours the oxidation reaction had begun to progress satisfactorily and the temperature was decreased to about 125 C. and the temperature was maintained at this point during the remainder of the reaction. Air blowing was continued until the acid number of the wax being oxidized was approximately 265 mg. KOH/g. The product was removed from the oxidation vessel and found to have a saponification number of 485, an acid number of 266 and a saponification number-acid number ratio of 1.8. This product, which amounted to 9000 parts by weight, will be referred to herein as Product A.

A small proportion of Product A was reserved for use in subsequent experimental work and the major portion, about 8500 parts, was washed with two 10-volume portions of water at about 100° C. After settling and removal of the aqueous phase there remained 5800 parts by weight of the water-insoluble fraction of wax oxidate. This product, which will be referred to as Product B, had an acid number of 160, a saponification number of 300 and a saponification number-acid number ratio of 1.85.

About 4000 parts by weight of Product B was extracted with two 3-volume portions of a light petroleum naphtha having a boiling range of 50° C. to 85° C. After separation of the naphtha phase the insoluble phase was heated to 120° C. to evaporate the dissolved naphtha. The resulting naphtha-insoluble fraction amounted to 2620 parts by weight, corresponding to a yield of 66% based on Product B. This water-insoluble, naphtha-insoluble fraction, which will be referred to as Product C, had an acid number of 169, a saponification number of 345 and a saponification number-acid number ratio of 1.75. Analysis of this product indicated a total oxygen to carboxyl oxygen ratio of about 1.5.

About 1000 parts by weight of Product B was subjected to borax extraction as described herein. This amount of the water-washed wax oxidate was mixed with 1650 parts by weight of an aqueous solution of sodium borate containing 9.1% by weight of the borax. The mixture thus formed was extracted three times with 1500 parts by weight of a petroleum naphtha at a temperature of 70° C. and the resulting hydrocarbon and aqueous phases separated. The aqueous phase containing the borate complex was heated to 95° C. to evaporate dissolved naphtha and then acidified with 69.5 parts by weight of 42% sulfuric acid. The acid was added slowly with agitation to prevent local over-heating. The separated acid fraction was water-washed to remove inorganic salts and acids.

The naphtha phase obtained in the above extraction step was further extracted with 192 parts by weight of a 13% by weight solution of sodium borate in water at a temperature of 70° C. in order to remove small amounts of acids capable of forming borate complexes which were retained in the naphtha during the original extraction. The aqueous borate complex phase was separated, acidified and water-washed as above to obtain additional acids. These acids were combined with the acids obtained in the initial borax extraction step and the combined products will be referred to hereinafter as Product D. This product has an acid number of 195, a saponification number of 320 and a saponification number-acid number ratio of 1.7, and amounts to 58% by weight of the original Product B. Extraction of this fraction with light petroleum naphtha fails to dissolve any acidic material, showing that acids separated in this manner are naphtha-insoluble.

*Example II.—Direct amidation of naphtha-insoluble fraction of oxidized wax*

A series of five experiments was carried out in which Product C was directly treated with ammonia to produce amides and, for comparison, in a sixth experiment a sample of alpha-hydroxy decanoic acid was converted into the corresponding amide by the same procedure. In carrying out these experiments a portion of the acid mixture was heated to a temperature within the range of 80° C. to 220° C. and a stream of ammonia was passed into the heated mixture as rapidly as it could be absorbed. The temperature was gradually increased during the blowing with ammonia to within the range of 150° C. to 240° C. and this temperature maintained and blowing with ammonia continued until no further quantities of water were evolved. Depending on the batch size, ammonia flow rate, and temperature, the time required for this reaction to occur was between about 0.5 and 48 hours. The results of the various experiments are presented below. In each case, with the exception of the alpha-hydroxy decanamide which was a white crystalline compound and was purified by recrystallization from methanol before analysis, the products were clear dark-brown viscous liquids substantially insoluble in hydrocarbon solvents, alcohols and esters and almost completely soluble in acetone.

TABLE 1

| Experiment No | Naphtha-Insoluble Acids (Product C) | | | | | Alpha-Hydroxy Decanoic Acid |
|---|---|---|---|---|---|---|
| | 1 | 2 | 3ᵃ | 4ᵃ | 5 | 6 |
| Final Reaction Temp., °C | 210 | 180 | 205 | 205 | 180 | 154 |
| Time, hours | 4 | 17 | 2 | 7 | 16 | 7 |
| Acid No., mg.KOH/g | 28 | 46 | 43 | 27 | 52 | 0 |
| Saponification No., mg.KOH/g | 85 | 216 | 179 | 146 | 235 | 0 |
| Ester No., mg.KOH/g | 57 | 170 | 136 | 119 | 183 | 0 |
| Nitrogen, Percent: | | | | | | |
| Dumas (Total) | 5.36 | | 4.83 | 4.46 | 3.2 | 7.6 |
| Kjeldahl (Total) | | 6.2 | | | | 7.6 |
| Van Slyke (Amino) | 1.0 | | 1.2 | 1.2 | | 0 |

ᵃ The starting materials for Experiments 3 and 4 were obtained from Product C by dissolving a portion of Product C in acetone and adding hexane in increments until approximately 50% of the original Product C had been rejected. The rejected material was used in Experimental 3 and the more soluble fraction, after removal of solvents, was used in Experiment 4.

*Example III.—Direct ammonolysis of esters without solvent*

A methyl ester was prepared by refluxing a mixture of 150 parts naphtha-insoluble acids (Product C), 300 parts methanol and 1 part sulfuric acid for 4 hours. The solution was cooled, diluted with 900 parts of water and extracted twice with 200 parts of ethyl ether. The combined ether extracts were washed several times with water until neutral, dried over anhydrous sodium sulfate, filtered, and the solvent removed by distillation. The yield of crude methyl ester was about 140 parts.

The methyl esters produced as above were divided, a one-third portion being retained without modification. The remaining material was fractionated by extraction three times with 4 volumes of pentane. The extract and raffinate phases were then distilled to remove solvent. The original preparation and fractions were characterized as follows:

| | Pentane-Soluble Esters | Pentane-Insoluble Esters | Combined Crude Esters |
|---|---|---|---|
| Recovery | 48% | 52% | |
| Appearance | Light orange-brown fluid oil | Very dark-brown viscous oil | Dark-brown waxy oil |
| Acid No | 5.7 | 31.6 | 15.9 |
| Saponification No | 250 | 254 | 257 |

Each of these methyl esters was subjected to direct ammonolysis by a technique directly comparable to that used in Example II for amidation of the acids. The results of tests on the ammonolysis products of these three experiments, together with reaction temperatures and times, are shown in the following table. The pentane-soluble esters were used in Experiment 1, the pentane-insoluble esters were used in Experiment 2 and the crude esters in Experiment 3.

TABLE 2

| | Amides from Methyl Esters of Naphtha-Insoluble Acids | | |
|---|---|---|---|
| Experiment No | 1 | 2 | 3 |
| Final reaction temperature, °C | 174 | 180 | 250 |
| Time, hours | 14 | 6 | 2 |
| Acid No., mg.KOH/g | 16 | 22 | 11 |
| Saponification No., mg.KOH/g | 204 | 251 | 159 |
| Ester No., mg.KOH/g | 188 | 229 | 148 |
| Nitrogen, percent, Dumas (total) | 3.45 | 3.14 | 4.24 |

Each of the above products is similar to the products of Example II in regard to physical characteristics. The product of Experiment 1 is somewhat more fluid than that of Experiment 3 and the product of Experiment 2 is extremely viscous.

*Example IV.—Ammonolysis of esters in solvent at low temperature*

Esters were prepared by reacting 3 liters of methanol, 500 g. of Product C from Example I and 2 g. of concentrated sulfuric acid. This mixture was permitted to stand at 25° C. until the acid number of the product reached a constant value. This required 48 hours. At this time the product was saturated with ammonia at room temperature and allowed to stand for 10 days. At this time the solvent was distilled and completely removed by vacuum stripping at 150° C. and 5 mm. pressure. The yield was 464 g. of a dark-brown very viscous liquid.

TABLE 3

| | Amides from Methyl Esters of Naphtha-Insoluble Acids |
|---|---|
| Acid No., mg.KOH/g | 34 |
| Saponification No., mg.KOH/g | 250 |
| Ester No., mg.KOH/g | 116 |
| Nitrogen, Percent: | |
| Kjeldahl (Total) | 4.9 |
| Van Slyke (Amino) | 0.7 |

*Example V.—Amidation with urea*

A mixture of 21 parts by weight of urea and 100 parts by weight of Product C from Example I (approximately 0.6 mol urea per carboxyl group) was heated at 160° C. for 6 hours. At the end of this time the product was poured into water and washed to remove unreacted urea and other water-soluble products. Approximately 76 parts of water-insoluble product was recovered.

The water-washed product was found to be only partially soluble in acetone. Extraction with acetone gave one fraction amounting to about 44 parts of acetone-soluble amides, the remaining 32 parts being insoluble in acetone. Analysis of the soluble and insoluble fractions after removing the acetone by distillation gave the following results:

TABLE 4

|  | Acetone-Soluble Portion | Acetone-Insoluble Portion |
| --- | --- | --- |
| Appearance | Dark red-brown viscous oil. | Dark red-brown tacky resin. |
| Acid No., mg.KOH/g | 47 | 48. |
| Saponification No., mg.KOH/g | 213 | 212. |
| Ester No., mg.KOH/g | 166 | 164. |
| Nitrogen, Percent, Dumas (Total) | 4.45 | 5.06. |

Example VI

A mixture of 8 parts by weight of technical brown iron oxide, 1 part by weight p-amino phenol, 1 part of hexamethylene tetramine and 4 parts by weight of the amide produced in Experiment 1 of Example II was placed on a hot plate maintained at a temperature of 130° C. The mixture was stirred for 18 minutes, at which time a stiff paste formed, which was then transferred to an oven maintained at 130° C. for 30 minutes to finish the curing. The resulting product was cooled, ground to a fine powder and molded by compression in a disc mold previously dusted with zinc stearate as a mold release agent, at 100° C. and 3,000 pounds per square inch pressure for ½ hour. The mold was cooled to 50° C. and the disc removed for testing. Several discs were prepared for evaluation. The resulting molded discs were dark red, smooth, hard and tough. They were not affected by immersion in water, lubricating oil and kerosene, respectively, after 3 weeks. This composition was regarded as being applicable in the preparation of floor tile, as by calendering, as well as the preparation of various molded articles. The products could be drilled, sawed, tapped, machined, etc.

The above preparation was duplicated using paraformaldehyde in place of hexamethylene tetramine and the resulting molded articles were substantially the same quality.

Example VII

Example VI was repeated using powdered oil shale in place of the iron oxide. The molded discs produced were very similar in properties to those obtained in Example I, except for color and general appearance. These discs were black and had a lustrous appearance.

Example VIII

Example VI was repeated except that California bentonite clay was used in place of the iron oxide. The discs produced in this experiment were light in color but otherwise had the same properties as those obtained in Example VI.

Example IX

Molded articles of greater tensile strength and having greater impact resistance than those produced in Examples VI to VIII, inclusive, were prepared using fibrous materials as fillers. Various compositions were prepared following the procedure outlined in Example VI, except that half of the filler described in that example was replaced with asbestos fiber. The resulting molded discs had all of the properties indicated for the products of Example VI and in addition were tougher and had greater tensile strength.

Example X

Products even less brittle than those produced in Example IX were prepared using a lower ratio of aldehyde to amide. A mixture of 6 grams of iron oxide (technical brown), 1 gram hexamethylene tetramine, 0.5 gram p-amino phenol and 6 grams of amide of the type employed in Example VI was placed on a hot plate at 130° C. and to this mixture was added 6 grams of asbestos fiber. The entire mass was stirred with a spatula for 10 minutes when a stiff paste was formed and the product was then oven cured for 30 minutes at 130° C. The cooled mass was broken up into a coarse powder and molded by compression in a disc mold at 130° C. and 3,000 pounds pressure per square inch for 5 minutes. The mold was cooled and the disc removed for testing. This product was dark red in color, smooth, hard and very tough. Its resistance to impact was greater than that of the products of the previous examples.

Example XI

A synthetic moldable resin was prepared on a two roll mill (rubber mill) with both rolls heated to 140° C. and separated about 0.01 inch. A 144 gram portion of amide from Experiment 3 of Example III was banded on the mill and to the amide the following materials were added in the order mentioned as fast as the mill would handle them, 144 grams titanium dioxide-calcium sulfate (powdered white pigment), 24 grams hexamethylene tetramine, 12 grams p-amino phenol, 12 grams phthalocyanine green pigment. The mixture was cut off the rolls and remilled several times until uniformly mixed. This required approximately 15 minutes. The mill rolls were then separated approximately 0.10 inch, and to the mixture on the rolls was added 144 grams fiber asbestos and the milling continued for 3 minutes. The compounded resin was then sheeted off, oven cured at a temperature of 130° C. for 20 minutes and then cooled. This product was ground to a coarse powder and molded by compression in a disc mold, dusted with zinc stearate as a mold release agent, at 130° C. and 3,000 pounds per square inch gage for 5 minutes. The resulting disc was bright green, smooth, hard and tough.

Example XII

A composition suitable for floor tile was prepared as follows. A mixture of 90 parts by weight of Persian Gulf iron oxide, 150 parts by weight of 20-mesh limestone and 7.5 parts by weight of p-amino phenol, was mixed 10 minutes in a steam jacketed Banbury mixer. To the mixture was then added 90 parts by weight of amides produced as in Example VI and mixing continued for 5 minutes. The temperature of the mixture at this point was about 120° C. To the mixture was added 15 parts by weight of para-formaldehyde and then 90 parts by weight of asbestos fines and mixing continued for 5 minutes. The resulting uniform mixture was removed from the mixer while still hot and sheeted to about ⅜ inch thickness on calender rolls at about 50° C. The resulting sheet was oven cured at 130° C. for 30 minutes and then calendered again to a final thickness of ⅛ inch at a temperature of 130° C. The finished sheet was cooled on a smooth surface and cut with a linoleum knife, while still slightly warm, into 9 inch square tiles. The tiles produced were bright red, smooth to the touch, hard, tough and slightly flexible. Several pieces of tile produced as above described were laid by standard techniques used in the asphalt tile trade on walk-ways. Wear and weathering tests over a period of 6 months indicated that the tiles so formed would retain their good appearance and give satisfactory service for extended periods.

Floor tiles were prepared in the manner described above, except that different fillers, different pigments and different catalysts were employed. Thus, a second preparation was made substituting an equal amount of litharge for the Persian Gulf iron oxide and substituting dihydroxydiphenyl sulfone for the p-amino phenol. The tile produced had an orange color, but otherwise corresponded to the tile produced with iron oxide.

In a third preparation, carbon black was employed in place of the iron oxide used in the first preparation. The resulting tiles were black in color but had properties very similar to those of the ones described hereabove.

In a fourth experiment calcium hydroxide was substituted for the p-amino phenol and cotton flock was substituted for the asbestos used in the first preparation. The resulting tiles were of the same high quality as those of the other experiments.

In a fifth experiment ammonium sulfamate was employed as the catalyst but otherwise the composition was the same as that described in the first preparation. The tiles produced were of the same quality as those of the other experiments described in this example.

*Example XIII*

A composition suitable for preparing floor tile was made by mixing 180 parts by weight of powdered Colorado oil shale, 30 parts by weight of hexamethylene tetramine and 15 parts by weight of p-amino phenol in a Banbury mixer as in Example XII. Amides produced from water-insoluble, naphtha-insoluble wax acids as described in Experiment 1 of Example II were added slowly to the mixture in the Banbury mixer over a period of 12 minutes. The total amount of amide employed was 180 parts by weight. Following this addition, 180 parts by weight of asbestos fines were added and after 5 minutes of mixing, 300 grams of 20-mesh sand was added and mixing continued for 3 minutes. The resulting heavy, dough-like mass was oven cured for 30 minutes at 130° C. and calendered directly to a ⅛ inch thick sheet. The sheet, while still warm, was cut into standard 9 inch square tiles. These tiles were dark brown, almost black, and were smooth, hard and tough.

The above preparation was repeated using iron oxide in one case and calcium sulfate-tatanium dioxide in a second experiment in place of the oil shale.

All of the tiles produced as described above were tested following the methods of test set forth in Federal Standard Stock Catalog, section IV (part 5), Federal Specification for Tile; Asphalt, SS–T–306a, May 28, 1943. All of the tiles produced were found to meet the specification requirement in all respects. In addition these floor tiles withstood total immersion in kerosene for a period of 3 weeks. The only effect of immersion in kerosene was an improvement in gloss and impact strength. Under the same conditions of test, commercial asphalt tile was found to disintegrate completely in a few hours.

Although in the above specific examples p-amino phenol, 1,5-dihydroxydiphenyl sulfone, calcium hydroxide and ammonium sulfamate were the catalysts employed it is to be pointed out that the other compounds disclosed herein as condensation catalysts when substituted for the above catalysts in the amounts and under the conditions set forth herein cause the condensation reaction to proceed in the desired manner and result in the production of moldable resins of the same or similar properties.

Of the catalysts disclosed in addition to the ones employed in the specific examples, 2,4-dihydroxy benzaldehyde, naphthalene disulfonic acid, o-amino phenol, p,p′-diamino diphenylmethane, phenylmethyl pyrazolone have all been found to be particularly desirable catalytic agents in that these agents appear to improve the water resistance of the final molded articles.

Moreover, although para-formaldehyde and hexamethylene tetramine are the only aldehyde substances shown in the above indicated example, the other aldehyde substances or genitors disclosed herein may be substituted for the indicated aldehyde substances and the resulting resins and molded products have properties corresponding to those disclosed in the preceding examples. Thus, acetaldehyde has been used in preparing compositions such as those described in Example VI and the resulting molded products had properties corresponding to those of the products described in that example. Thus, formaldehyde, acetaldehyde or compounds which decompose to liberate formaldehyde under the conditions of reaction are all effective in producing the desired moldable resins.

The following examples are included for purposes of comparison to show that other fractions of oxidized paraffin wax and other acids differing in composition from the particular mixture of acids present in the water-insoluble, naphtha-insoluble fraction of oxidized paraffin wax as described herein when converted to amides and condensed with low molecular weight aldehydes or aldehyde genitors do not produce resins and molded articles having the properties of the products of this invention.

*Example XIV*

The naphtha-soluable acid fraction obtained by evaporating the naphtha following extraction of Product B of Example I with naphtha was amidated following the procedure outlined in Experiment 1 of Example II. The resulting amidated naphtha-soluble fraction of oxidized paraffin wax was condensed with hexamethylene tetramine in the presence of p-amino phenol and iron oxide following the procedure outlined in Example VI. The product, cured in the manner described in that example was soft. Upon molding the resulting resin in a disc mold under the conditions described in Example VI, the product was found to be soft and disintegrated by kerosene, lubricating oil and like solvents.

*Example XV*

Paraffin wax of the type described in Example I was oxidized in the manner described therein until the acid number of the product was 500 mg. KOH/g. This product, which was found to be substantially completely water soluble, was amidated according to the procedure outlined in Experiment 1, Example II. This amide product, which was a waxy crystalline slush, was condensed with hexamethylene tetramine following the procedure outlined in Example VI and the resulting resin was too soft to mold. The preparation was repeated using 3 parts of amide and this cured product was moldable, however, the resulting disc was disintegrated by water. Water immersion in water for 4 days the disc had completely disintegrated.

*Example XVI*

Paraffin wax of the type described in Example I was oxidized in the manner described therein until the acid number of the product was 467 mg. KOH/g. This product was extracted with water and then with naphtha to produce a water-insoluble, naphtha-insoluble fraction. This fraction was amidated with ammonia in the manner described in Experiment 1 of Example II. The resulting amide was a waxy crystalline slush rather than a fluid product.

The amide was condensed with hexamethylene tetramine in the manner described in Example VI and the resulting product, after curing, was too soft to be moldable. The condensation was repeated using 3 parts of amide per part of hexamethylene tetramine and in this case the cured resin was moldable but the resulting molded disc was not resistant to water. It completely disintegrated after 4 days in water.

The foregoing examples are illustrative of the invention but are not to be taken as limiting since variations may be made by those skilled in the art without departing from the spirit or the scope of the following claims.

I claim:

1. A moldable resin composition prepared by condensing a fluid amide with an aldehyde substance in the presence of a condensation catalyst and a filler, said fluid amide being a mixture of amides prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl oxygen ratio between 1.2 and 1.8 to 1, and amidating said fraction.

2. A moldable resin composition prepared by condensing, at a temperature between about 80° C. and 150° C., 1 part by weight of a fluid amide with between about 0.05 and 0.3 parts by weight of an aldehyde substance selected from the class consisting of formaldehyde, acetaldehyde and formaldehyde genitors in the presence of a condensation catalyst and between about 10% and about 85% by weight based on the amide of a filler, said fluid amide being a mixture of amides prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl oxygen ratio between 1.2 and 1.8 to 1 and amidating said fraction.

3. A moldable resin composition according to claim 2 in which said aldehyde substance is hexamethylene tetramine.

4. A moldable resin composition according to claim 2 in which said aldehyde substance is paraformaldehye.

5. A method for the production of a resin composition suitable for molding and calendering, which comprises condensing a fluid amide with between about 0.05 and about 0.3 part by weight of an aldehyde substance in the presence of a condensation catalyst and a filler to produce a solid resin composition, said fluid amide being prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl oxygen ration between 1.2 and 1.8 to 1 and amidating said fraction to form a fluid amide.

6. A method for the production of a resin composition suitable for molding and calendering which comprises condensing a fluid amide with between about 0.05 and about 0.3 part by weight of an aldehyde substance selected from the class consisting of formaldehyde, acetaldehyde and formaldehyde genitors in the presence of a condensation catalyst and between about 10% and about 85% by weight based on the amide of a mineral filler to produce a solid resin composition, said fluid amide being prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl oxygen ratio between 1.2 and 1.8 to 1 and amidating said fraction.

7. A method according to claim 6 in which said aldehyde substance is hexamethylene tetramine.

8. A method according to claim 6 in which said aldehyde substance is para-formaldehyde.

9. A method according to claim 6 in which the condensation is effected at temperatures between about 80° C. and 150° C.

References Cited in the file of this patent
UNITED STATES PATENTS 2,096,181   Jahrstorfer et al. _____ Oct. 19, 1937